3,021,306
POLYURETHANE ELASTOMERS CURED WITH N,N-DIMETHYLOLETHYLENEUREA

Ernest Csendes, Christiana Hundred, and John Joseph Verbanc, Brandywine Hundred, Del., assignors to E. I. du Pont de Nemours and Company, Wilmington, Del., a corporation of Delaware
No Drawing. Filed June 30, 1958, Ser. No. 745,262
6 Claims. (Cl. 260—67.5)

This invention relates to novel polyurethane elastomers and more particularly to polyether polyurethane elastomers which have been cured or cross-linked with dimethylolethyleneurea.

Heretofore numerous materials have been recommended for use as curing agents for polyurethane polymers. These materials serve as cross-linking agents and it is desirable to provide a cross-linking agent which will yield a cured elastomer having excellent physical properties such as compression set and abrasion resistance. Depending on the curing agent used, it is usually necessary to select a catalyst which will permit the curing or cross-linking to take place in a reasonable length of time.

It is an object of the present invention to provide a novel process for curing polyether polyurethane polymers. A further object is to provide a process for curing such polymers with dimethylolethyleneurea in the presence of quinolinium tetrachlorozincate as a catalyst. A still further object is to provide a novel cured polyether polyurethane elastomer which has excellent physical properties. Other objects will appear hereinafter.

These and other objects of this invention are accomplished by providing a cured polyether polyurethane elastomer having a plurality of units of the formula

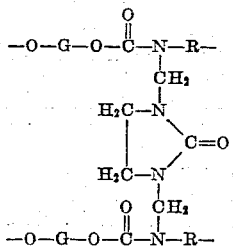

wherein —O—G—O— is a bivalent radical obtained by removing the terminal hydrogen atoms from a polyether glycol having a molecular weight of from about 750 to about 5,000, said glycol being selected from the group consisting of polyalkyleneether glycols, polyalkyleneether-thioether glycols and polyalkylene-aryleneether glycols, and R is a bivalent organic radical which is inert to isocyanate groups. The novel cured polyether polyurethane elastomers of the present invention are obtained by curing a polyether polyurethane polymer with from about 3 to 15 percent by weight of dimethylolethyleneurea in the presence of from about 0.1 to 1.0 percent by weight of quinolinium tetrachlorozincate. The polymer is compounded with the curing agent and the catalyst and then heated to a temperature of about 120 to 160° C. so as to effect a cure.

The polyether polyurethane polymers which may be cured according to the present invention may be prepared from polyether glycols, organic diisocyanates and, if desired, a chain-extending agent. The polyether glycols may be polyalkyleneether glycols, polyalkylene-thioether glycols or polyalkylene-aryleneether glycols, which glycols have molecular weights of between about 750 and 5,000. It is to be understood that mixtures of these glycols may be used.

The polyalkyleneether glycols are compounds which may be represented by the general formula $HO(GO)_nH$ wherein G is an alkylene radical which need not necessarily be the same in any particular glycol and n is an integer so that the average molecular weight of the polyalkyleneether glycol is at least about 750. These polyalkyleneether glycols may be prepared by well known methods. Representative polyalkyleneether glycols include polyethyleneether glycols, polypropyleneether glycols, polytrimethyleneether glycols, polytetramethyleneether glycols, polyether-propyleneether glycols, etc.

The polyalkyleneether-thioether glycols may be represented by the general formula set forth above for the polyalkyleneether glycols wherein part of the ether oxygens are replaced by sulfur atoms. These glycols may be prepared by well-known methods such as the catalytic dehydration of thiodiglycol and diethylene glycol.

The polyalkylene-aryleneether glycols are similar to the polyalkyleneether glycols except that some of the alkylene radicals are replaced by arylene radicals and, in addition, if desired, part of the ether oxygens may be replaced with sulfur. In general the phenylene and naphthalene radicals are preferred with or without substituents such as alkyl or alkylene groups. These glycols are described in U.S. Patent 2,843,568.

Any of a wide variety of organic diisocyanates may be used for reaction with the polyether glycol in preparing the polyether polyurethane polymers. Representative compounds include 2,4-tolylenediisocyanate, m-phenylenediisocyanate, 4-chloro-1,3-phenylenediisocyanate, 4,4'-diphenylenediisocyanate and 1,5-naphthalenediisocyanate. 2,4-tolylenediisocyanate is the preferred diisocyanate. In general any organic diisocyanate may be used which has no substituents reactive with the glycol other than the two isocyanate groups. Thus these diisocyanates may contain a wide variety of inert substituents such as hydrocarbon radicals, halogen radicals, nitro groups, alkoxy groups, etc.

In preparing the curable polyether polyurethane polymers various procedures may be employed. In one of these the polyether glycol is reacted with the organic diisocyanate in approximately stoichiometrically equivalent proportions in which case a plurality of urethane linkages will be formed and there will be substantially no free isocyanate groups in the final polymer. The resulting product will either be a solid or a liquid polymer. The liquid polyether polyurethanes result from the use of relatively low molecular weight polyether glycols, i.e. glycols having a molecular weight of about 750. The reaction of the glycol with the diisocyanate may be carried out in suitable mixing equipment at temperatures of from about 20° C. to about 150° C.

If desired the curable polymer may be prepared by reacting the polyether glycol with a molar excess of the organic diisocyanate in which case an isocyanate-terminated intermediate polymer will be formed. This intermediate polymer may then be reacted with a monofunctional compound such as alkanol in order to cap the free isocyanate groups, or, if desired, it may be reacted with a chain-extending agent which is an organic compound containing a plurality of active hydrogen atoms capable of reacting with isocyanates, there being no more than two atoms in the chain-extending agent having active hydrogen attached thereto. Representative chain-extending agents include compounds such as ethylene glycol, 2-allyloxymethyl-2-methyl-1,3-propanediol, hexamethylene glycol, diethylene glycol, etc.

As mentioned above, the curable polyether polyurethane polymers are cured according to the present invention by employing dimethylolethyleneurea as a curing agent in the presence of quinolinium tetrachlorozincate as a catalyst. The quinolinium tetrachlorozincate may be prepared according to the procedure described in "Chemical Abstracts" 29 (1935), page 2109.

In carrying out the curing process, the uncured polyether polyurethane polymer is compounded with the dimethylolethyleneurea and quinolinium tetrachlorozincate, preferably on a mill. If desired during the milling procedure, other compounding ingredients can be used such as carbon black, silica, various plasticizers, dyes, etc. In the instances where the uncured polyether polyurethane is a liquid the curing agent and catalyst may be incorporated therewith simply by mixing. In such cases the liquid dimethylether of dimethylolethyleneurea may be used.

The compounded curable polymer is then subjected to heating at a temperature of from about 120 to 160° C. in order for the curing reaction to take place. Temperatures of from about 140 to 150° C. are preferred. Normally the curing reaction is carried out in a pressure mold for a curing time of from about 30 minutes to about 3 hours.

The amount of dimethylolethyleneurea which is used as a curing or cross-linking agent may vary between about 3 to 15 percent by weight based on the weight of the uncured polymer. It is to be understood that the amount of curing agent may vary depending on the degree of cure desired as well as the physical properties desired in the final cured product. It has been determined that if less than about 3% by weight of curing agent is used the tensile strength and compression set of the cured elastomer will be deficient whereas the use of more than about 15% of curing agent is unnecessary in order to get satisfactory cures.

The amount of quinolinium tetrachlorozincate which is used as a catalyst in the curing procedure may vary from about 0.1 to 1.0 percent by weight based on the weight of the uncured polymer.

The mechanism of the curing reaction involves the reaction of the terminal hydroxyl groups of dimethylolethyleneurea with the hydrogen atoms on the urethane nitrogen linkages in the uncured polymer whereby two such urethane nitrogen atoms are linked together by the dimethylolethyleneurea residue. The cured elastomers will therefore, contain a plurality of units of the formula

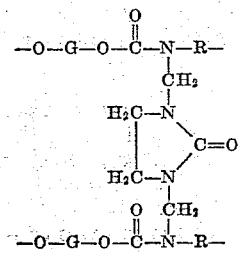

wherein —O—G—O— and R have the significance defined above.

The cured elastomers of the present invention are characterized by having excellent physical properties, particularly good abrasion resistance and good compression set. In addition it has been determined that elastomers having good abrasion resistance may be obtained according to the curing process of the present invention without compounding the elastomer with carbon black. As a result of this, light colored elastomers with excellent physical properties may be obtained. The cured elastomers have many varied uses in common with other polyurethane elastomers in that they may be used in the preparation of tires, tubes, belts, hoses and tubing, wire and cable jackets, gaskets and the like.

The basic elastomeric properties of the elastomers may be varied by suitable compounding. The amount and type of compounding agent incorporated in the stock is dependent upon the use for which the elastomer is intended. Included among such of the more important useful compounding agents are carbon black, clay, silica, talc, and plasticizers.

The following examples will better illustrate the nature of the present invention; however, the invention is not intended to be limited to these examples. Parts are by weight unless otherwise indicated.

The following methods were used to carry out the tests for evaluating elastomers:

Heat build-up: D623–52T (Method A)
Compression set: D395–53T (Method B, 22 hrs., 70° C. and 70 hrs., 100° C.)
Stress strain: Williams ring tester

EXAMPLE 1

A polymer was prepared by reacting 0.2 mole of a polytetramethyleneether glycol having a molecular weight of 1040 with 0.2 mole of 2,4-toluenediisocyanate in the presence of 0.018% by weight of the reactants of ferric acetyl acetonate at 130° C. for 60 minutes. The resulting polymer showed no free isocyanate groups by analysis. This polymer was compounded on a mill as follows:

|  | Parts by Weight | |
|---|---|---|
|  | A | B |
| Polymer | 100 | 100 |
| High abrasion furnace black | 30 | |
| Silica filler | | 30 |
| Dimethylolethyleneurea | 6 | 6 |
| Quinolinium tetrachlorozincate | 0.35 | 0.35 |

Samples of the compounded polymers were then cured at 150° C. for 80 minutes. The following table indicates the physical properties of the cured elastomers:

Table I

|  | A | B |
|---|---|---|
| Modulus at 300% elongation, 25° C. (lb./in.²) | | 600 |
| Tensile at break, 25° C. (lb./in.²) | 2,300 | 3,200 |
| Elongation at break, 25° C. (percent) | 220 | 700 |
| Tensile at break, 70° C. (lb./in.²) | 500 | 1,300 |
| Yerzley resilience, 25° C. (percent) | 85 | 61 |
| Compression set, 70° C. (percent) | 23 | |
| Shore A hardness | 75 | 75 |
| Abrasion test: N.B.S.—Index | 286 | 387 |

The elastomer compounded according to Formula B was white, since no furnace black was used, and it is obvious from the above that its abrasive properties are excellent.

EXAMPLE 2

A polyalkyleneether polyurethane polymer is prepared by adding 3 moles of 2,4-toluenediisocyanate to one mole of 3-(allyloxy)-1,2-propanediol and the mixture thus obtained is agitated for 3 hours at 80° C. under an atmosphere of nitrogen. Then 2 moles of a polytetramethyleneether glycol of molecular weight 1000 is added and the mass is agitated at 80° for one hour. Finally, it is transferred to a polyethylene lined container and heated in an oven at 80° for 72 hours. A rubbery polymer is obtained.

This polymer is compounded on a rubber roll mill employing the usual procedure. A number of formulations are compounded, each one containing 100 parts of the polymer, 30 parts of high abrasion furnace black, and varying amounts of dimethylolethyleneurea and quinolinium tetrachlorozincate. The following table illustrates the recipes used:

Table II

|  | A | B | C | D | E | F |
|---|---|---|---|---|---|---|
| Polymer | 100 | 100 | 100 | 100 | 100 | 100 |
| HAF | 30 | 30 | 30 | 30 | 30 | 30 |
| Quinolinium tetrachlorozincate | 0.1 | 0.1 | 0.5 | 0.5 | 0.35 | 1.0 |
| Dimethylolethyleneurea | 1 | 3 | 3 | 6.25 | 12.5 | 3 |

Samples of the above formulations were cured at 150° C. for 80 minutes to yield elastomers having the properties set out in the following table:

Table III

|  | A | B | C | D | E | F |
|---|---|---|---|---|---|---|
| $M_{300}$, 25° C. (lb./in.²) | 800 | 2,600 | 2,850 | ------ | ------ | 2,450 |
| $T_B$, 25° C. (lb./in.²) | 2,300 | 3,500 | 5,000 | 3,500 | 2,500 | 4,700 |
| $E_B$, 25° C. (percent) | 620 | 370 | 420 | 220 | 180 | 450 |
| $T_B$ at 70° C. (lb./in.²) | (¹) | 1,250 | 2,000 | 1,300 | 900 | 2,200 |
| Yerzley resilience at— |  |  |  |  |  |  |
| 25° C. (percent) | 57 | 62 | 63 | 63 | 69 | 59 |
| 100° C. (percent) | 58 | 71 | 74 | 86 | 86 | 69 |
| Compression set, 70° C. (percent) | 70 | 30 | 18 | 16 | 27 | 25 |
| Shore A hardness | 69 | 71 | 72 | 77 | 78 | 72 |

¹ Too soft to measure.

EXAMPLE 3

A liquid polyether polyurethane was prepared by condensing 3 moles of a polytetramethyleneether glycol having a molecular weight of 1000 with 4 moles of 2,4-toluenediisocyanate at 80° C. and for 4 hours. The resulting product was capped by adding 2 moles of allyl alcohol and agitating thoroughly.

The liquid product was compounded as follows:

Polymer _____ 40
Dimethylolethyleneurea _____ 4.9
Quinolinium tetrachlorozincate _____ 0.14

After heating the compounded elastomer at 140° C. for about 5 minutes, a tough rubbery gel was obtained which had very good resilience.

EXAMPLE 4

A number of formulations were made using the polymer prepared of Example 2:

Table IV

|  | A | B | C | D | E | F | G |
|---|---|---|---|---|---|---|---|
| Polymer of Ex. 2 | 100 | 110 | 100 | 100 | 100 | 100 | 100 |
| High abrasion furnace black | 30 | 30 | 30 | 30 | ---- | ---- | ---- |
| Carbon black | ---- | ---- | ---- | ---- | 30 | ---- | ---- |
| Colloidal silica filler | ---- | ---- | ---- | ---- | ---- | 30 | ---- |
| Clay filler | ---- | ---- | ---- | ---- | ---- | ---- | 30 |
| Quinolinium tetrachlorozincate | 0.35 | 0.45 | 0.55 | 0.35 | 0.35 | 0.35 | 0.35 |
| Dimethylolethyleneurea | 6 | 8 | 9 | 6 | 6 | 6 | 6 |
| Dioctylphthalate | ---- | ---- | ---- | 15 | ---- | ---- | ---- |
| Hydroxyl terminated polytetramethylene ether urethane plasticizer | 15 | 30 | 50 | ---- | ---- | ---- | ---- |

On curing at 150° C. for 80 minutes, the compounded polymers had the following physical properties:

Table V

|  | A | B | C | D | E | F | G |
|---|---|---|---|---|---|---|---|
| $M_{300}$, 25° C. (lb./in.²) | ---- | ---- | ---- | ---- | ---- | 3,000 | ---- |
| $T_B$, 25° C. (lb./in.²) | 2,700 | 3,000 | 2,700 | 1,700 | 3,500 | 4,500 | 2,300 |
| $E_B$, 25° C. (percent) | 280 | 230 | 250 | 210 | 210 | 360 | 290 |
| $T_B$, 70° C. (lb./in.²) | 800 | 1,000 | 1,000 | 500 | 900 | 1,400 | 600 |
| Yerzley resilience, 25° C. (percent) | 66 | 65 | 59 | 73 | 73 | 68 | 75 |
| Compression set, 70° C. (percent) (22 hrs.) | 20 | 21 | 26 | 23 | 20 | 22 | 20 |
| Compression set, 100° C. (percent) (70 hrs.) | ---- | ---- | ---- | ---- | 58 | 53 | 55 |
| Shore A hardness | 66 | 70 | 66 | 65 | 71 | 75 | 66 |
| Heat build up: $\Delta c$ (³⁄₁₆" stroke, mils) | 10 | 11 | 33 | 6 | 20 | 42 | 3 |
| Final center temp. (° C.) | 163 | 166 | 171 | 148 | 158 | 196 | 159 |
| NBS—Abrasion index | 351 | 471 | 431 | 338 | 286 | 257 | 132 |

NOTE.—$\Delta c$=Final compression—minimum compression.

As many widely different embodiments of this invention may be made without departing from the spirit and scope thereof, it is to be understood that this invention is not limited to the specific embodiments thereof except as defined in the appended claims.

What is claimed is:

1. A cured polyurethane elastomer obtained by heat-curing a curable polyether polyurethane polymer with N,N'-dimethylolethyleneurea, said polyurethane polymer being substantially free of uncombined isocyanate radicals and consisting essentially of a plurality of units of the formula

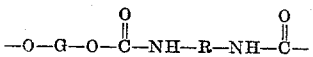

wherein —O—G—O— is a bivalent radical obtained by removing the terminal hydrogen atoms from a polyether glycol having a molecular weight of from about 750 to about 5,000, said glycol being selected from the group consisting of polyalkyleneether glycols, polyalkyleneether-thioether glycols and polyalkylene-aryleneether glycols, and R is a bivalent organic radical which is inert to isocyanate groups.

2. A cured elastomer according to claim 1 wherein the bivalent radical —O—G—O— is obtained by removing the terminal hydrogen atoms from a polytetramethyleneether glycol.

3. A cured elastomer according to claim 2 wherein R is a 2,4-tolylene radical.

4. A process for preparing a cured elastomer which comprises heating a polyether polyurethane polymer to a temperature of from about 120 to 160° C. with from about 3 to 15 percent by weight of the polymer of N,N'-dimethylolethyleneurea in the presence of from 0.1 to 1.0 percent by weight of the polymer of quinolinium tetrachlorozincate, said polyurethane polymer being substantially free of uncombined isocyanate radicals and consisting essentially of a plurality of units of the formula

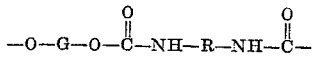

wherein —O—G—O— is a bivalent radical obtained by removing the terminal hydrogen atoms from a polyether glycol having a molecular weight of from about 750 to about 5,000, said glycol being selected from the group consisting of polyalkyleneether glycols, polyalkyleneether-thioether glycols and polyalkylene-aryleneether glycols, and R is a bivalent organic radical which is inert to isocyanate groups.

5. A process according to claim 4 wherein the polyether polyurethane polymer is prepared from a polytetramethyleneether glycol having a molecular weight of at least 750 and 2,4-toluene diisocyanate.

6. A process according to claim 4 wherein the polyether polyurethane polymer is prepared by reacting 3-(allyloxy)-1,2-propanediol with a molar excess of 2,4-toluene diisocyanate and reacting the resulting product with a polytetramethyleneether glycol having a molecular weight of at least 750.

References Cited in the file of this patent

UNITED STATES PATENTS

| | | |
|---|---|---|
| 2,373,136 | Hoover et al. | Apr. 10, 1945 |
| 2,785,150 | Kreider et al. | Mar. 12, 1957 |
| 2,801,230 | Fraser et al. | July 30, 1957 |
| 2,814,606 | Stilmar | Nov. 26, 1957 |
| 2,850,474 | Maxey | Sept. 2, 1958 |
| 2,921,926 | Kehr | Jan. 19, 1960 |
| 2,921,927 | Csendes | Jan. 19, 1960 |